June 28, 1955        E. M. FORD        2,711,633
SEQUENTIAL OPERATING TRACTOR HYDRAULIC SYSTEM
Filed March 19, 1954        4 Sheets-Sheet 1
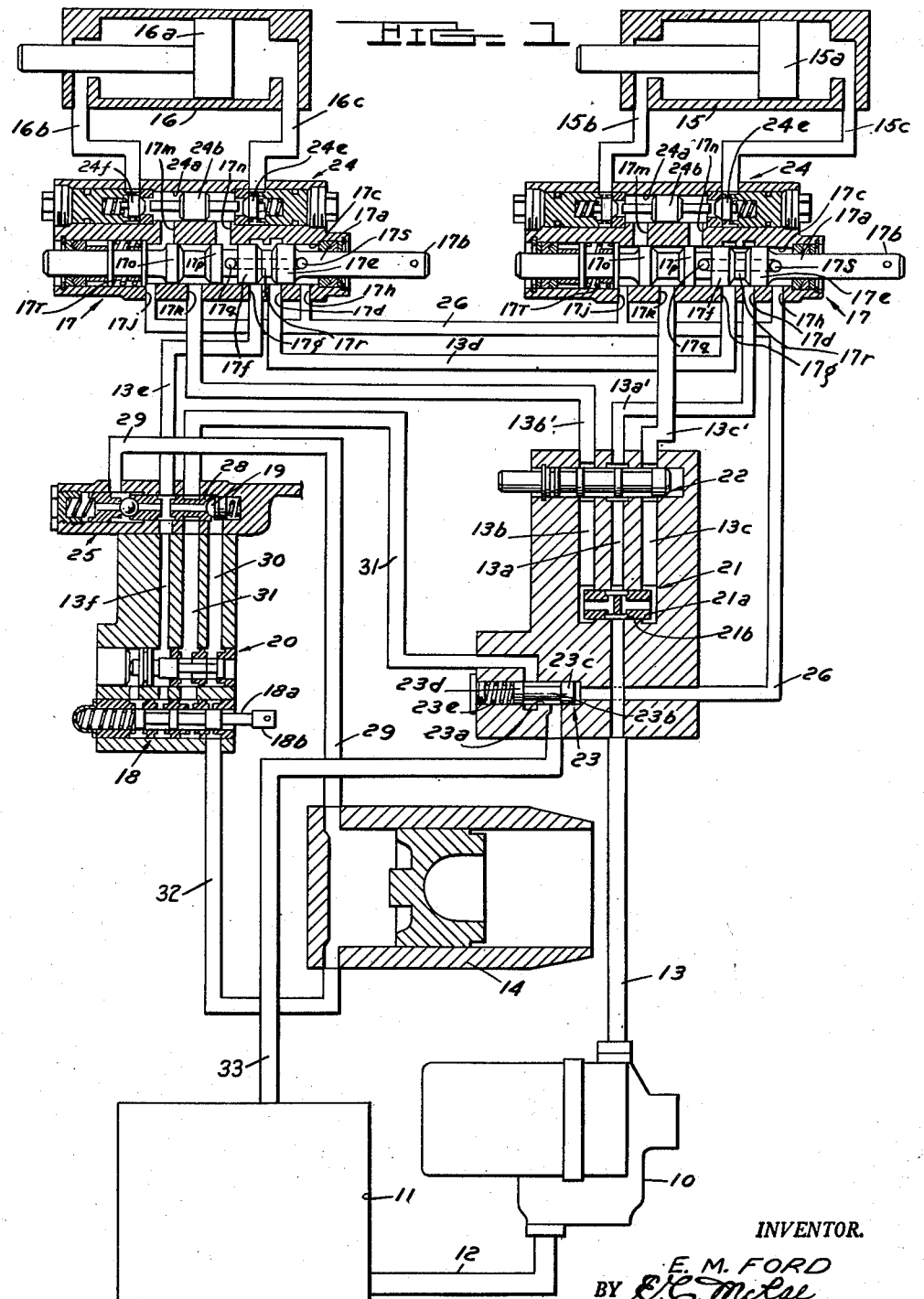
INVENTOR.
E. M. FORD

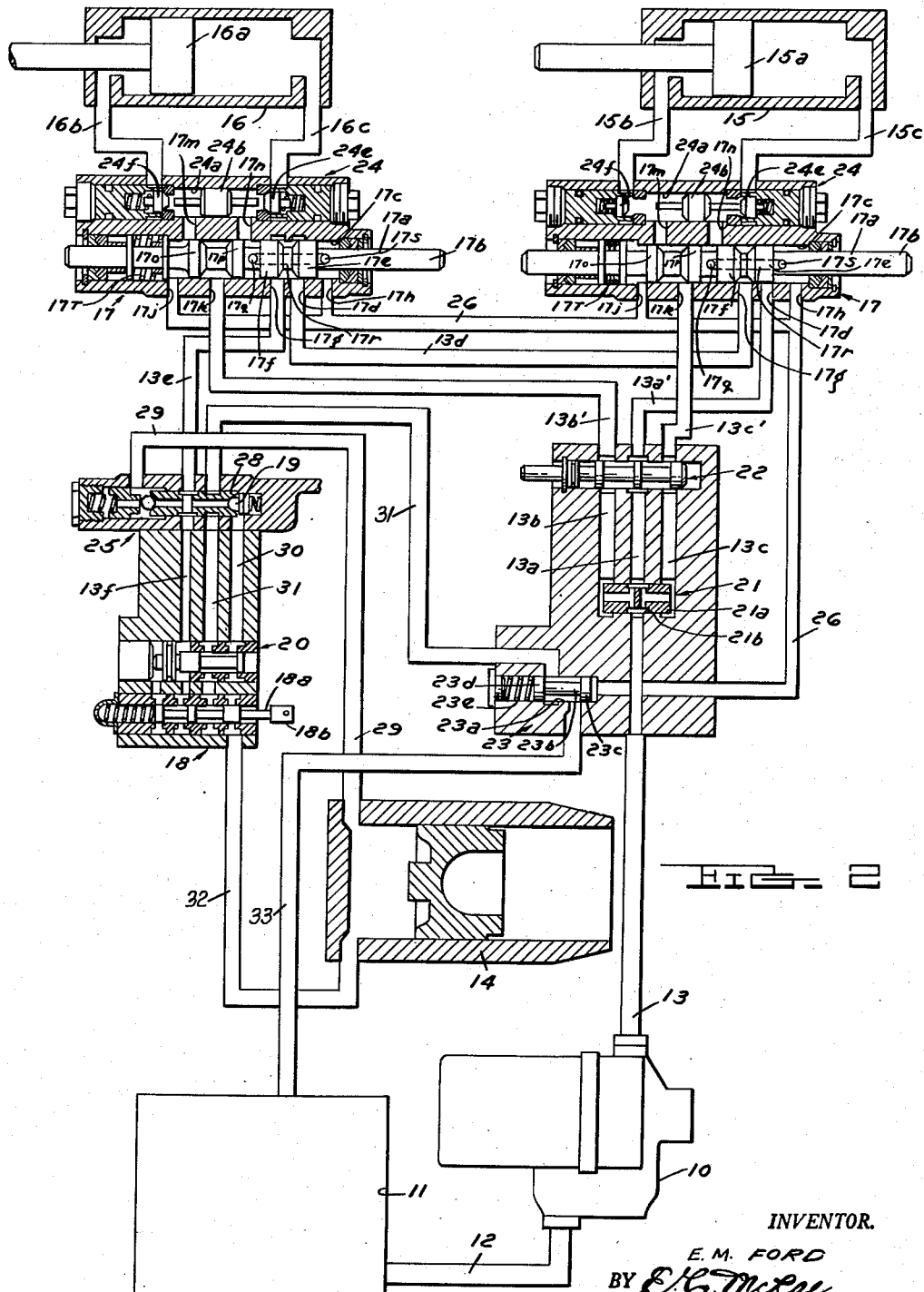

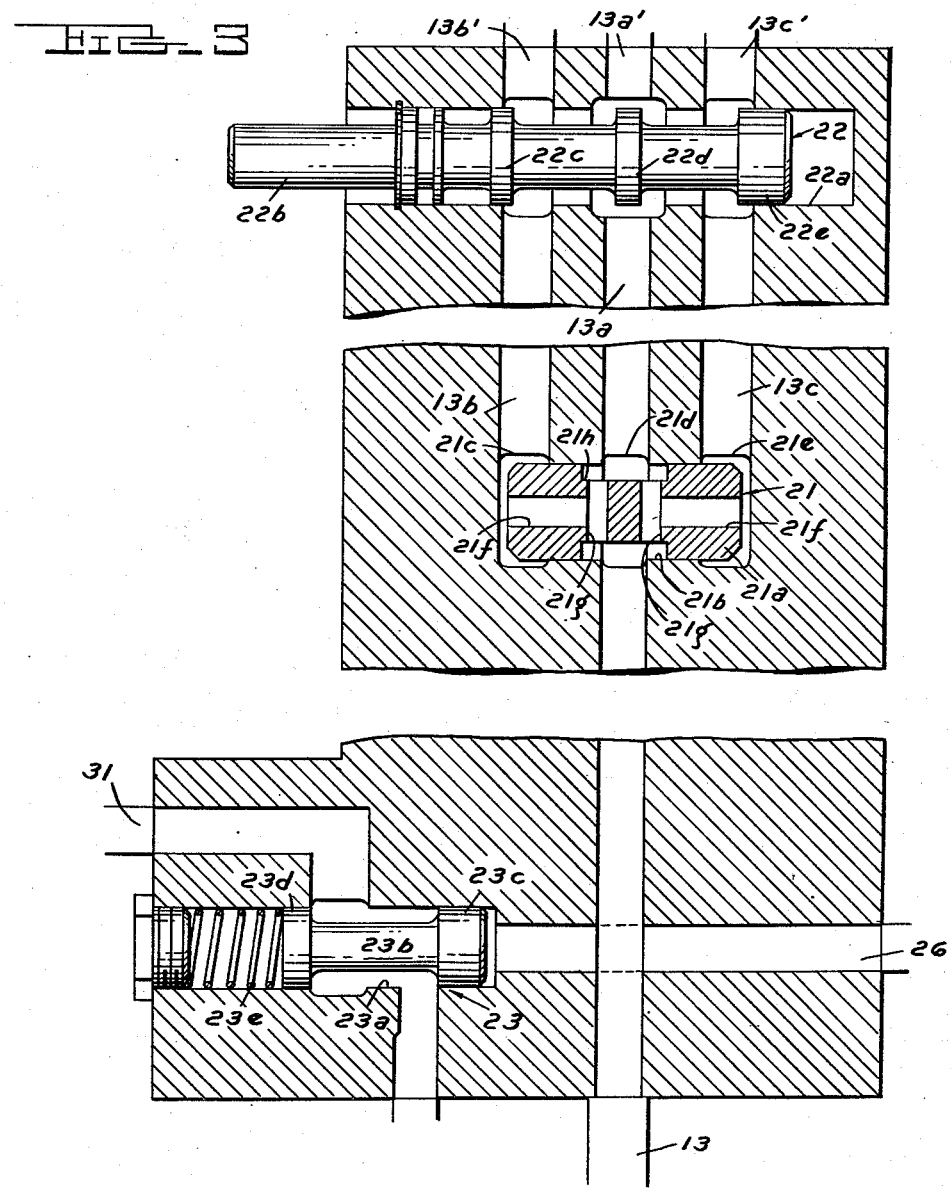

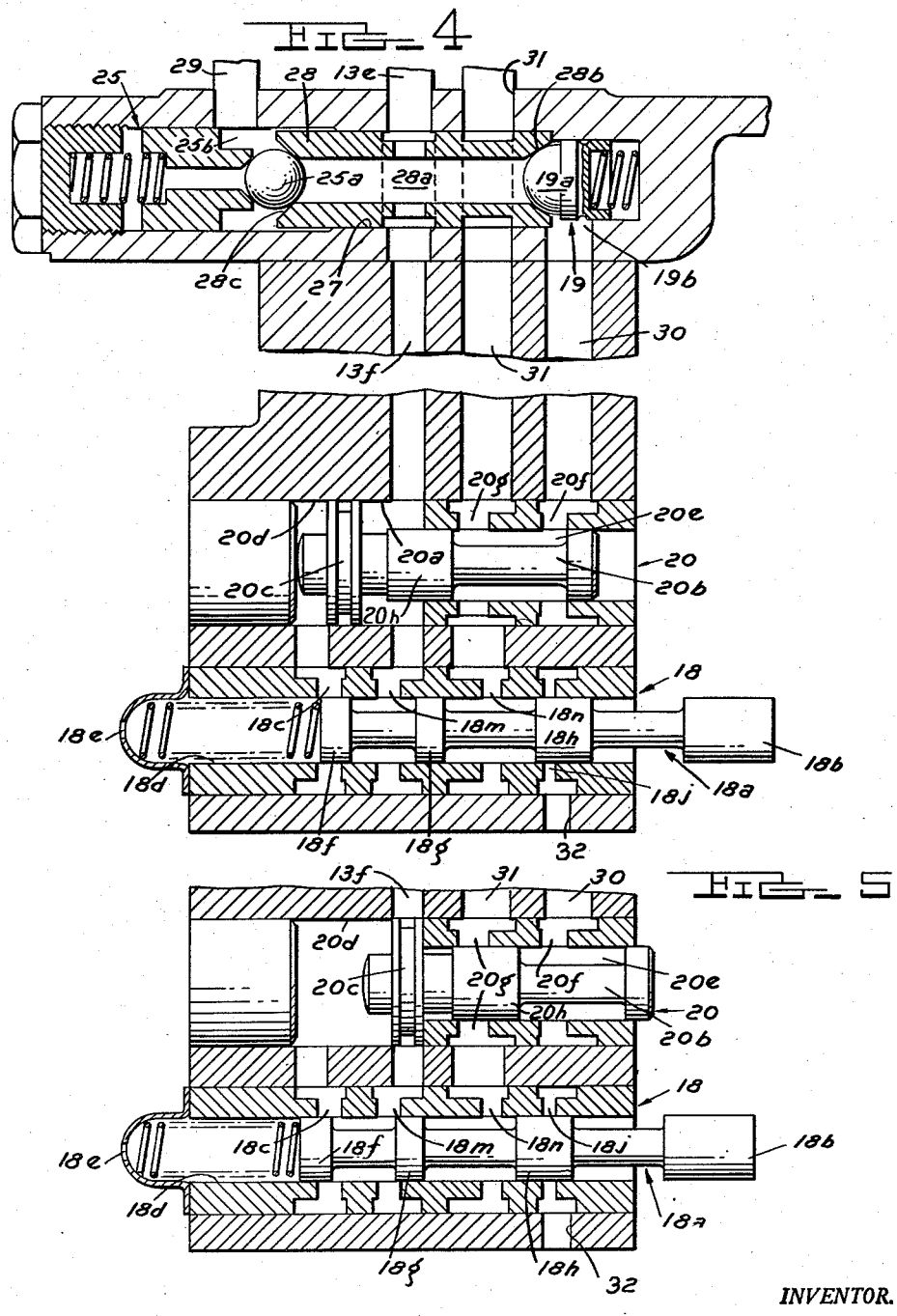

United States Patent Office 2,711,633
Patented June 28, 1955

2,711,633

SEQUENTIAL OPERATING TRACTOR HYDRAULIC SYSTEM

Earl M. Ford, Royal Oak, Mich., assignor to Ford Motor Company, Dearborn, Mich., a corporation of Delaware Application March 19, 1954, Serial No. 417,464

3 Claims. (Cl. 60—52)

This invention relates to an improved hydraulic system for agricultural type tractors, and particularly to that type of tractor incorporating a primary hydraulic ram and one or more secondary hydraulic rams for operating specialized implements or groups of implements.

It has been customary to provide mounted cultivators for tractors which are constructed with three principal elements, respectively, a pair of forward elements which respectively mount on opposite sides of the tractor, and a rear cultivating element which is primarily utilized for eradicating the wheel marks of the tractor. When operating this type of cultivator in fields where a row crop is planted on the contour, it is often necessary that the two side mounted cultivating elements be capable of independent control so that one element may be lifted from or lowered to contact with the ground prior to the other element. Additionally, in entering or leaving any cultivated field, it is always desirable that the two side mounted elements be actuated ahead of the rear mounted element; thus, when the tractor first enters the field, the side mounted cultivating elements should be immediately dropped into engagement with the ground but it is unnecessary and often undesirable for the rear mounted cultivating element to engage the ground until the tractor rear wheels have entered the rows. Conversely, when leaving the end of the row, it is desirable that the side mounted elements be raised as the front of the tractor passes off the end of the row but that the rear mounted element not be raised until the tractor rear wheels have passed out of the row.

It has heretofore been proposed that separate hydraulic rams be utilized to respectively control the two side mounted cultivating units as well as the rear mounted unit. However, the hydraulic control arrangements heretofore available for such rams have not been satisfactory in that they fail to provide the desired flexibility of operation of the various tractor rams and, more particularly, they did not provide both independent, concurrent operation of the side mounted units, as well as sequential operation of the side mounted units with respect to the rear mounted units.

Similar problems arise in other implements where it is necessary to provide independent or sequential operation of a primary ram with one or more secondary rams.

Accordingly, it is an object of this invention to provide an improved hydraulic control system for tractors of the agricultural type.

It is a further object of this invention to provide an improved hydraulic control system for tractors or other devices wherein a primary ram and one or more secondary hydraulic rams are required to be controlled. More particularly, it is an object of this invention to provide a hydraulic control system for a plurality of hydraulic rams which will selectively permit the concurrent, independent, or sequential operation of the various hydraulic rams.

The specific nature of this invention, as well as other objects and advantages thereof, will become apparent to those skilled in the art from the following detailed description, taken in conjunction with the annexed sheets of drawings on which, by way of preferred example only, is illustrated one embodiment of this invention.

On the drawings:

Figure 1 is a schematic hydraulic circuit diagram of a hydraulic control system embodying this invention, with the various elements of the system shown in their neutral position.

Figure 2 is a view similar to Figure 1 but wherein the various elements of the system are positioned so as to permit actuation of one of the secondary rams in the system.

Figure 3 is an enlarged scale schematic view of the flow equalizing valve and its bypass valve utilized in the system of Figure 1.

Figure 4 is an enlarged scale schematic view of the shuttle valve, low pressure relief valve and check valve utilized in the system of Figure 1 with the elements thereof shown in their neutral positions.

Figure 5 is a view similar to Figure 4 but with the valve elements shown in their positions corresponding to a demand for pressured fluid.

As shown on the drawings:

While not limited thereto, a hydraulic control system embodying this invention is particularly adapted for use with a pump of the constantly operating type. Such pump is indicated schematically by the numeral 10 on the drawing and has its inlet connected to a suitable sump or reservoir 11 by a conduit 12. The discharge side of pump 10 is connected to a conduit 13 and all pressured fluid for operation of the various elements of the system is supplied through conduit 13.

The numeral 14 represents a primary hydraulic ram of the hydraulic system. Generally, such ram is mounted internally in the tractor (not shown) and is conventionally connected to a pair of trailing hitch links for effecting power lifted movements of rear attached equipment. Also, it is common to have the reservoir 11 defined by the main housing of the tractor, for example, the differential housing, and accordingly, all of the various valve units are mounted within the reservoir 11 so that any open passages from the various valve elements constitute fluid connections to the sump.

In addition to the primary ram 14, one or more secondary rams 15 and 16 may be provided. For purposes of illustrating this invention, two such secondary rams are shown but it will be obvious to those skilled in the art that any desired number of such secondary rams may be incorporated in the improved hydraulic control circuit. Each secondary ram is provided with an identical ram control valve unit 17 and identical fluid connections are utilized to connect each of the control valves 17 into the hydraulic system and to its corresponding secondary ram 15 or 16. It will be further noted that the primary ram 14 is illustrated as being of the single acting type while the secondary rams 15 and 16 are illustrated to be of the double acting type. Whether any of such rams are of the single acting or double acting type is immaterial to the practice of this invention, as it would require only obvious modifications to the disclosed circuits to adapt them for utilization with a primary double acting ram and secondary single acting rams, or any other desired combination.

A primary control valve 18 is provided and in most applications, such primary control valve would be physically located in the vicinity of the one or more secondary control valves 17 so that all of the various control levers would be grouped conveniently for the operator. The primary control valve 18 is illustrated as having a spool type control element 18a having one end thereof 18b projecting out of the associated valve housing. Similarly, the secondary control valves 17 have spool elements 17a with one end 17b thereof projecting out of the associated valve housing. Such projecting ends are conventionally connected to manual or automatic operating linkages (not shown) for effecting the desired control of the various control valves. Additionally, the hydraulic control system incorporates a low pressure relief valve 19, a shuttle type unloading valve 20, a flow equalizing valve 21, a bypass valve 22 for the flow equalizing valve, and a drain cut off valve 23. Additionally, each of the secondary ram control valves 17 is provided with a cooperating check valve unit 24 of the shuttle actuated type. A conventional check valve 25 is provided for primary ram 14.

Each of the various valves heretofore mentioned, is of conventional construction and accordingly, no detailed description of the configuration of such valves will be given, except as is necessary to more clearly illustrate the operation of each valve in the hydraulic system.

Both the primary control valve 18 and the secondary control valve 17 are of the conventional three position type, i. e., having a neutral position wherein no action takes place in the hydraulic system and the output of the pump 10 is merely bypassed to the sump 11, a "raise" position wherein pressured hydraulic fluids is supplied to the corresponding ram, and a "lower" position wherein the corresponding ram is actuated in the opposite direction to the movement produced by the "raise" position of the associated control valve. Obviously, where double acting rams are employed, any operation of the ram involves both the supply of pressured fluid to one side of the ram piston and the withdrawal of fluid trapped on the other side of the ram piston. The terms "raise" and "lower" as used herein are relative only and employed merely to indicate the opposite directions of movement of the various rams, irrespective of whether the rams are physically operating in a vertical direction.

The main supply conduit 13 is directly connected to the flow equalizing valve 21. Valve 21 (Figure 3) is of conventional construction, comprising a pressure actuated piston element 21a which is slidable to a limited degree in a valve bore 21b. A plurality of discharge ports 21c, 21d and 21e are provided in axially spaced relationship along the bore 21b. The valve piston 21a has a central axial bore 21f in each end which respectively communicates in the central portion of the valve element with radial bores 21g. The central portion of piston 21a has an annular groove 21h formed therein, which, in cooperation with the radial bores 21g, provides at all times a fluid connection between center port 21b and the fluid supply conduit 13. The amount or rate of flow of fluid into either of the end ports 21c or 21e is, of course, dependent upon the axial position of the valve element 21a and such element automatically adjusts its axial position so as to tend to maintain equal rates of flow in the discharge conduits 13b and 13c which are respectively connected to the ports 21c and 21e.

The center port 21d is connected to a conduit 13a and all three conduits 13a, 13b and 13c, are connected in axially spaced relation to the bore 22a of the bypass valve 22 for the flow equalizing valve 21. Bypass valve 22 has a manually actuable valve piston element 22b which has three axially spaced piston portions 22c, 22d and 22e which respectively cooperate with fluid conduits 13b, 13a and 13c. In the active position of bypass valve 22, as shown in Figures 1 and 3, the piston elements 22c, 22d and 22e are positioned to permit unimpeded fluid flow through the respective conduits 13b, 13a and 13c to continuation conduits 13a', 13b' and 13c', and also fluid can flow from main supply conduit 13a directly into both continuation conduits 13b' and 13c' so that the flow equalizing valve 21 is effectively bypassed. However, by manually shifting the valve piston 22b to the right as viewed in Figures 1 and 3, it will be apparent that fluid flow into the continuation conduit 13a' is unaffected while fluid flow into the continuation conduits 13b' and 13c' can only be supplied by fluid flowing through conduits 13b and 13c respectively, and hence such flow is subject to the action of the flow regulating valve 21.

The primary supply continuation conduit 13a' extends to a port 17d formed in the wall of control valve bore 17c of one of the control valves 17. The control valve spool 17a has two axially spaced piston portions 17e and 17f which are disposed to control fluid flow between the port 17d and an outlet port 17g provided in close axial relationship to port 17d. As mentioned, both valves 17 are identical, thus, a flow path between ports 17d and 17g is provided in each of the secondary control valves 17, which is controlled by the valve spool 17a. Such flow paths are connected in series relationship with the main supply conduit 13a' by virtue of a connecting conduit 13d which extends between the outlet port 17g of the one control valve and the inlet port 17d of the other control valve. A continuation conduit 13e is connected to the outlet port of the other control valve to transmit the pressured fluid to the primary control valve 18 that will be later described.

Additionally, each secondary control valve bore 17c is provided with two drain ports 17h and 17j respectively located at opposite ends of such bore. These drain ports are connected by a conduit 26 to the drain cut-off valve 23 whose function will be later described.

Each secondary control valve 17 is additionally provided with an inlet port 17k to which one of the fluid supply continuation conduits 13b' or 13c' is connected. Outlet ports 17m and 17n are axially spaced on each side of port 17k and communicate with the bore 24a of the shuttle actuated check valve 24. Piston portions 17o and 17p on control valve spool 17a cooperate to selectively control communication between port 17k and either port 17m or 17n. The manner in which each secondary control valve 17 and the shuttle actuated check valve unit 24 cooperate to control the displacement of the corresponding ram 15 or 16 is entirely conventional and hence will not be described in great detail. Whenever the valve spool 17a is shifted from its neutral piston illustrated in Figure 1, for example, to the "raise" position illustrated in Figure 2, all fluid flow in the primary supply conduit 13d or 13e is interrupted and the pressured fluid output of the pump is permitted to flow into the valve bore 24a of the check valve unit 24. As illustrated in Figure 2, such flow occurs through the port 17m which communicates between check valve chamber 24a and secondary control valve bore 17c; the pressured fluid operates upon the adjacent end of the shuttle 24b to displace it to the other end of the chamber 24a whereupon it opens a spring pressed check valve 24e to permit fluid to drain from the corresponding end of the connected ram 15 or 16 through conduit 15c or 16c. At the same time, the fluid pressure unseats the check valve 24f and fluid flows directly into the other end of the ram 15 or 16 through conduit 15b or 16b to effect the displacement of the ram piston 15a or 16a. The path for the draining fluid is defined by the drain conduit 15c, or 16c through the check valve 24e and thence through port 17n into secondary control valve bore 17c thence through the radial port 17q, thence axial bore 17r and radial port 17s formed in the valve spool 17a and thence through the port 17h into the drain conduit 26. In the event that it is desired to actuate the ram 15 in the opposite or "lower" direction, the valve spool 17 is moved to the right as viewed in the drawings and this effects the supply of pressured fluid to the opposite side of the shuttle 24b which moves to the left to open check valve 24f and establish a path for draining of fluid through ports 17m and 17j to drain conduit 26, while the other check valve 24e is open by the pressured fluid to admit pressured fluid to the other side of the ram piston 15a or 16a.

The operation of both secondary control valve units 17 is identical to that heretofore described and hence it is apparent that the hydraulic rams 15 and 16 may be independently or concurrently controlled in accordance with the manual actuations of the valve spools 17a. Whenever concurrent operation is effected the flow equalizing valve 21 operates to produce equal flow to each ram, hence insuring equal rates of operation of the secondary rams.

Turning now to consideration of the control of the primary ram 14, it is seen that the primary fluid supply conduit 13e has a direct path through the hollow central portion 28a of a sleeve-like valve seat 28 (Figure 4) which is inserted in a bore 27 which has the low pressure relief valve 19 mounted in one end and the primary ram check valve 25 mounted in the other end. The primary fluid supply conduit 13e thus connects to a continuation conduit 13f which is connected to the chamber 20a of an unloading valve 20. At one end of sleeve 28 an annular seat 28b is provided with which a spring pressed, low pressure relief valve plunger 19a cooperates. At the other end, the sleeve 28 defines an annular seat 28c with which the ball 25a of check valve unit 25 cooperates. A conduit 29 is provided to connect the check valve chamber 25b with the primary ram 14. Thus, whenever the pressure in primary supply conduit 13e rises sufficiently to unseat check valve 25, fluid will be supplied to primary ram 14, Figure 2.

A conduit 30 is provided which connects the low pressure relief chamber 19b thru port 20f with a low pressure chamber portion 20b (Figure 4) of the unloading valve 20.

In the neutral position of unloading valve 20, a flow path is provided through ports 20f and 20g which connects conduit 30 to a primary draining conduit 31 which at its other end is connected to the drain cutoff valve 23. Additionally, the spool 20b of the unloading valve 20 is provided with a large diameter piston portion 20c which cooperates with a large diameter bore portion 20d. One side of piston portion 20c is exposed to the pressured fluid from the pump flowing through conduit 13f while the other larger area side of piston 20c is normally exposed to sump pressure by virtue of a connection to the sump through the port 18c and open end 18e of the primary control valve bore 18d.

The spool 18a of primary control valve 18 is provided with three axially spaced piston portions 18f, 18g, and 18h respectively. In the neutral position of primary control valve 18, the spools 18g and 18h cooperate to block the flow of pressured fluid from the primary conduit 13f and to maintain the sump pressure on the outer side of the large diameter portion 20c of unloading valve. The piston portion 18h covers a port 18j which is connected by conduit 32 to the primary cylinder 14 and thus prevents the draining of fluid from the primary ram 14 so long as the primary control valve 18 remains in said neutral position.

Upon shifting of the primary control valve 18 to its "raise" position illustrated in Figure 5, the pressured fluid from main supply conduit 13f is permitted to be applied to the large diameter side of the piston portion 20c of the unloading valve 20 through ports 18c and 18m. Since the low pressure relief valve 19 operates to continuously maintain a predetermined low pressure within the system, this results in the unloading valve 20 being forceably shifted to the right, as shown in Figure 5. In this position, the conduit 30, through which the low pressure relief valve was dumping fluid to the sump, is effectively blocked by the piston portion 20h and hence the pressure in the system is permitted to rise to the maximum level permitted by a relief valve unit (not shown) which is conventionally incorporated in the discharge side of pump 10. Such rise of fluid pressure in the system effects the unseating of the check valve ball 25a and the supply of pressured fluid flows directly to the primary ram 14.

When "lowering" movement of the ram 14 is desired, the primary control valve 18 is shifted to the right from the position shown in Figures 1 and 4 and fluid may drain from the ram 14, thru conduit 32, port 18j, port 18n, port 20g and drain conduit 31.

It has already been mentioned that both the primary drain conduit 31 which transmits fluid draining from primary ram 14, and the secondary drain conduit 26, transmitting fluid returning from either or both of the secondary rams 15 and 16 are fluid connected to the drain cut-off valve 23. Valve 23 comprises a cylindrical valve chamber 23a within which a valve piston element 23b is slidably mounted. Piston element 23b has two axially spaced piston portions 23c and 23d which are arranged with respect to the conduits 26 and 31 and a sump conduit 33 so that when one conduit, for example the primary drain conduit 31 in Figure 1 is connected to the sump conduit 33, the other conduit 26 will be blocked, as shown in Figure 1, by the piston portion 23c. A spring 23e is provided which operates against the valve 23b to yieldingly hold it in the position shown in Figure 1. However, it will be noted that the piston portion 23c is subject to the pressure existing in the secondary drain conduit 26 but is pressure balanced with respect to any pressure existing in the primary drain conduit 31. As a result, whenever any pressure exists in the secondary drain conduit 26, the valve piston 23c will be displaced to the left, as viewed in the drawings, and thus effect the connection of secondary drain conduit 26 to the sump conduit 33 while completely blocking any fluid flow through the primary drain conduit 31. There will, of course, always be sufficient pressure in secondary drain conduit 26 to effect the required displacement of valve piston 23b to block the primary drain conduit 31, due to the fact that the full pressure output of the pump is applied to either or both of the secondary rams 15 and 16 to displace fluid from the end of the cylinder toward which the ram pistons 15a or 16a are approaching.

From the foregoing description, it is clearly apparent that a primary ram 14 may be operated entirely independently of the secondary rams 15 and 16 merely by manipulation of the primary control valve 18 alone. However, in the event that the control valves for the primary ram 14 and either one or both of the secondary rams 15 and 16 are concurrently actuated, e. g., the control valve 18 and one or both of the valves 17 are concurrently actuated to their "lower" positions, then the primary ram 14 will not be actuated until secondary rams 15 and 16 have completed their strokes or the secondary control valves 17 have been returned to their neutral position.

When either or both of the secondary control valves 17 are concurrently actuated with the primary control valve 18 to their "raise" positions, as shown in Figure 2, the piston portion 17e of the secondary control valves effect a discontinuance of the flow path between the ports 17d and 17g and hence interrupts all fluid flow in the primary fluid flow conduits 13e. When no pressured fluid is supplied to conduit 13e, the low pressure relief valve 19 is effectively cut out of the circuit and, of course, pressured fluid cannot be supplied to the primary ram 14. Hence, the pressure in the system will rise and the secondary ram 15 or 16 will initiate its stroke and no pressure will be applied to the primary ram 14 until both of the secondary control valves 17 are returned to neutral position. To assist in the return of secondary control valve 17 to neutral position a conventional centered spring arrangement 17t is provided, operating on one end of the control valve spool 17a.

From the aforegoing description, it is clear that this invention provides an improved hydraulic control arrangement for a primary and one or more secondary rams which permits either the independent or concurrent operation of the secondary rams and either the independent or sequential operation of the secondary rams with respect to the primary ram.

I claim:

1. In a tractor hydraulic system having a pump and a sump, a first ram, a first shiftable control valve, having a "raise," a "lower" and a neutral position, means operatively connecting said first control valve in fluid circuit with said pump, sump and said first ram, whereby both the neutral position and the "lower" position of said first control valve bypasses the fluid output of said pump to sump and the "raise" position of said first control valve directs the fluid output of said pump to said first ram, said last mentioned means including a drain conduit for returning fluid from said first ram to said sump during "lowering" movements of said first ram, a second hydraulic ram, a second shiftable control valve having a "raise," a "lower" and a neutral position, means operatively connecting said second valve in fluid circuit with said pump, said second hydraulic ram and said sump whereby both the neutral position and the "lower" position of said second control valve bypasses the fluid output of said pump to sump and the "raise" position of said second control valve directs the fluid output of said pump to said first ram, said last mentioned means including a second drain conduit for returning fluid from said second ram to sump during "lowering" movements of said second ram, a two position valve connected between said first and second drain conduits and said sump, said two position valve having a shiftable element operable in one position to connect said first drain conduit to sump while blocking said second drain conduit and in the other position connecting said second drain conduit to sump while blocking said first conduit, resilient means normally holding said shiftable element in one of said positions, and means responsive to pressure in only one blocked drain conduit for shifting said valve element to the other of said positions, whereby concurrent actuation of both of said control valves to said "lower" position produces sequential "lowering" of said rams.

2. In a tractor hydraulic system having a pump and a sump, a first ram, a first shiftable control valve having a "raise," a "lower" and a neutral position, means operatively connecting said first control valve in fluid circuit with said pump, sump and said first ram, whereby both the neutral position and the "lower" position of said first control valve bypasses the fluid output of said pump to sump and the "raise" position of said first control valve directs the fluid output of said pump to said first ram, said last mentioned means including a supply conduit extending to the discharge side of said pump and a drain conduit for returning fluid from said ram to said sump during lowering movements of said ram, a second hydraulic ram, a second shiftable control valve having a "raise," a "lower" and a neutral position, means operatively connecting said second control valve in fluid circuit with said pump, said second hydraulic ram and said sump whereby both the neutral position and the "lower" position of said second control valve bypasses the fluid output of said pump to sump and the "raise" position of said second control valve directs the fluid output of said pump to said second ram, said second control valve having a flow path therethru forming part of said supply conduit, and a valve element in said second control valve cooperable with said flow path to cut off fluid flow in said supply conduit only in the "raise" position of said control valve, whereby concurrent actuation of said control valves to "raise" position produces only raising movement of said second ram until said second control valve is returned to neutral position, said last mentioned means including a second drain conduit for returning fluid from said second ram to sump during "lowering" movements of said second ram, a two position valve connected between said first and second drain conduits and said sump, said two position valve having a shiftable element operable in one position to connect said first drain conduit to sump while blocking said second drain conduit and in the other position connecting said second drain conduit to sump while blocking said first conduit, resilient means normally holding said shiftable element in one of said positions, and means responsive to pressure in only one blocked drain conduit for shifting said valve element to the other of said positions, whereby concurrent actuation of both of said control valves to said "lower" position produces sequential "lowering" of said rams.

3. In a hydraulic system for agricultural tractors of the type having a primary ram and a pair of secondary rams, a pump, and a shiftable control valve associated with each ram and having "raise," "lower" and neutral positions for selectively controlling the supply of fluid to said rams, the improvements comprising a fluid supply conduit for each of said rams, a flow equalizing device operatively connected between said two secondary ram supply conduits and the discharge side of said pump, thereby equalizing fluid flow to said secondary rams whenever said secondary control valves are concurrently actuated, a manually actuatable bypass valve connected in parallel relationship with said flow equalizing valve, said bypass valve having a shiftable element operable between a first position permitting fluid flow therethru to both said secondary ram supply conduits to bypass said flow equalizing device and a second position preventing fluid flow, each of said secondary control valves having a flow path therethru, and a shiftable valve element arranged to cut off fluid flow thru said flow path when said secondary control valve is actuated to its said "raise" position, said flow paths being respectively connected in series relationship with said primary ram supply conduit, whereby concurrent actuation of said control valves to said "raise" position produces only actuation of said secondary rams until both of said secondary control valves are returned to said neutral position.

No references cited.